US006542656B1

(12) United States Patent
Hill (10) Patent No.: US 6,542,656 B1
(45) Date of Patent: Apr. 1, 2003

(54) ADD-DROP OPTICAL SWITCHES INCLUDING PARALLEL FIXED AND MOVABLE REFLECTORS AND METHODS OF FABRICATING SAME

(75) Inventor: Edward A. Hill, Chapel Hill, NC (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/543,539

(22) Filed: Apr. 5, 2000

(51) Int. Cl.⁷ .............................. G02B 6/35; G02B 6/12
(52) U.S. Cl. .............................. 385/18; 385/17; 385/24; 385/14
(58) Field of Search .............................. 385/18, 24, 16, 385/17, 19, 14; 216/2, 24; 264/1.24, 1.25

(56) References Cited

U.S. PATENT DOCUMENTS

| 4,580,873 A | 4/1986 | Levinson |
| 4,674,828 A | * 6/1987 | Takahashi et al. |
| 4,775,206 A | * 10/1988 | Erman et al. |
| 4,815,827 A | * 3/1989 | Lane |
| 4,932,745 A | * 6/1990 | Blonder |
| 5,778,118 A | 7/1998 | Sridhar .......................... 385/24 |
| 5,841,917 A | 11/1998 | Jungerman et al. ............. 385/17 |
| 5,909,078 A | 6/1999 | Wood et al. .................. 310/307 |
| 5,955,817 A | 9/1999 | Dhuler et al. ................. 310/307 |
| 5,960,132 A | 9/1999 | Lin ............................. 385/18 |
| 5,960,133 A | 9/1999 | Tomlinson .................... 385/18 |
| 5,962,949 A | 10/1999 | Dhuler et al. ................. 310/307 |
| 5,974,207 A | 10/1999 | Aksyuk et al. ................. 385/24 |
| 5,994,816 A | 11/1999 | Dhuler et al. ................. 310/307 |
| 5,995,817 A | 11/1999 | Lübbe et al. ................. 455/266 |
| 6,023,121 A | 2/2000 | Dhuler et al. ................. 310/307 |
| 6,144,781 A | 11/2000 | Goldstein et al. .............. 385/18 |
| 6,215,222 B1 | 4/2001 | Hoen ........................... 310/309 |
| 6,240,223 B1 | * 5/2001 | Glance .......................... 385/24 |
| 6,259,835 B1 | 7/2001 | Jing ............................. 385/18 |
| 6,317,530 B1 | * 11/2001 | Ford ............................. 385/17 |

OTHER PUBLICATIONS

L.Y. Lin et al. Free–Space Micromachined Optical Switches with Submillisecond Switching Time for Large–Scale Optical Crossconnects. Photonics Technology Letters vol. 10, No. 4, pp. 525–527. Apr. 1998.*

* cited by examiner

*Primary Examiner*—Rodney Bovernick
*Assistant Examiner*—Mike Stahl
(74) *Attorney, Agent, or Firm*—Myers Bigel Sibley & Sajovec (57) ABSTRACT

Add-drop optical switches include fixed reflectors, such as fixed mirrors, and movable reflectors, such as movable mirrors, wherein none of the fixed reflectors and none of the movable reflectors are oriented orthogonal to one another on a substrate when the movable reflectors that provide the add-drop functionality are in a radiation reflecting position. In preferred embodiments, each of the fixed and movable reflectors is oriented parallel to or at a 70° angle to, the remaining fixed and movable reflectors when the movable reflectors are in the radiation reflecting position. Most preferably, the fixed reflectors and the movable reflectors all are oriented on the substrate in parallel when the movable reflectors are in the radiation reflecting position. By providing these orientations of fixed and movable reflectors, add-drop optical switches may be fabricated on silicon substrates using wet etching along crystallographic planes. High performance add-drop optical switches thereby may be provided.

8 Claims, 5 Drawing Sheets

ADD-DROP OPTICAL SWITCHES INCLUDING PARALLEL FIXED AND MOVABLE REFLECTORS AND METHODS OF FABRICATING SAME

FIELD OF THE INVENTION

This invention relates to optical communication systems, and more particularly to add-drop optical switches and methods of fabricating same.

BACKGROUND OF THE INVENTION

Optical communication systems are increasingly being used to communicate data, voice, multimedia and/or other communications. Optical communication systems may employ optical fibers and/or free space optical communication paths. It will be understood by those having skill in the art that optical communication systems may use optical radiation in the visible, ultraviolet, infrared and/or other portions of the electromagnetic radiation spectrum.

An important component in optical communications is the add-drop optical switch, also referred to as an add-drop multiplexer. As is well known to those having skill in the art, an add-drop multiplexer receives optical radiation from an IN optical path and transmits this optical radiation to an OUT optical path. However, the add-drop optical switch also has the capability of removing an optical signal from the IN optical path and placing the signal on a DROP optical path. The add-drop optical switch also has the capability to place an optical signal on an ADD optical path, so that the optical signal from the ADD optical path is placed on the OUT optical path. Accordingly, the add-drop optical switch can selectively couple the IN optical path to the OUT optical path, the IN optical path to the DROP optical path and the ADD optical path to the OUT optical path. Add-drop optical switches can employ an array of fixed and/or movable reflectors, such as mirrors, to perform the above-described selective coupling. Add-drop optical switches are described, for example, in U.S. Pat. Nos. 5,778,118; 5,960,133 and 5,974,207, and need not be described further herein.

It has been proposed to fabricate add-drop optical switches using microelectromechanical system (MEMS) technology. As is well known to those having skill in the art, MEMS devices are potentially low cost devices, due to the use of microelectronic fabrication techniques. New functionality also may be provided, because MEMS devices can be much smaller than conventional electromechanical devices.

Unfortunately, it may be difficult to fabricate add-drop optical switches using MEMS technology. In particular, it may be difficult to fabricate reflectors that are oriented orthogonal to one another using MEMS fabrication processes. This potential difficulty now will be described in connection with FIG. 1.

Figure 1:
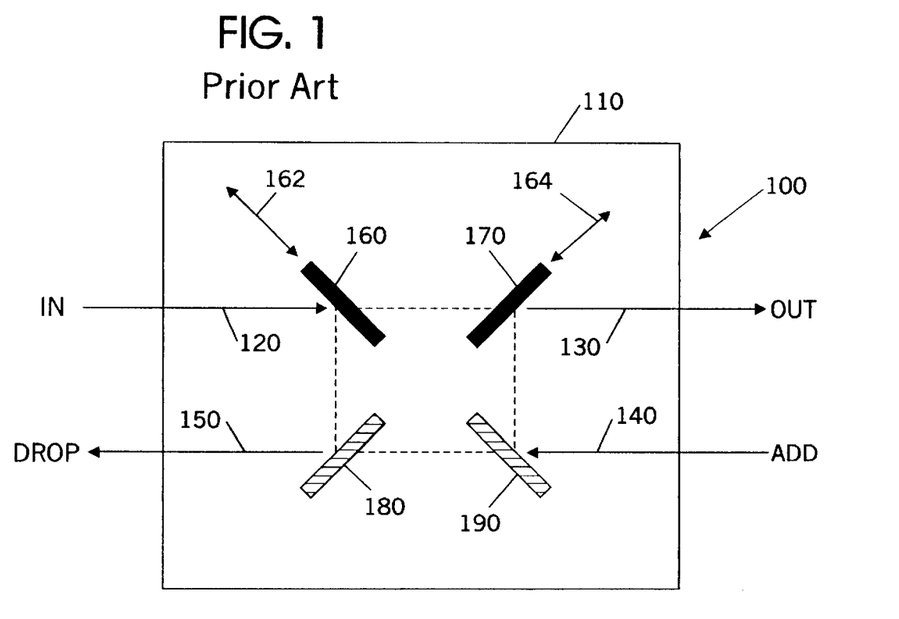
FIG. 1 is a top view of a conventional add-drop optical switch.

Referring now to FIG. 1, a conventional MEMS add-drop optical switch 100 is shown. As shown in FIG. 1, a conventional MEMS add-drop optical switch 100 can include a substrate 110, generally a monocrystalline silicon substrate. An IN optical path 120 on the substrate receives optical radiation. An OUT optical path 130 on the substrate transmits optical radiation. An ADD optical path 140 on the substrate receives optical radiation and a DROP optical path 150 on the substrate transmits optical radiation. The ADD, IN, OUT and DROP optical paths 140, 120, 130 and 150 all are oriented on the substrate 110 in parallel, on opposite sides of the substrate 110. A first fixed mirror 180 and a second fixed mirror 190 are fixedly coupled to the substrate 110. A first movable mirror 160 and a second movable mirror 170 are movably coupled to the substrate 110 for movement to and away from a radiation reflecting position as shown by the respective arrows 162 and 164. The fixed mirrors 180 and 190 and the movable mirrors 160 and 170 are arranged on the substrate 110, to selectively couple the IN optical path 120 to the OUT optical path 130, to selectively couple the IN optical path to the DROP optical path 150 and to selectively couple the ADD optical path 140 to the OUT optical path 130.

As shown in FIG. 1, the adjacent fixed mirrors 180 and 190 and movable mirrors 160 and 170 are oriented orthogonal (at a 90° angle) to one another. Unfortunately, it may be difficult to fabricate orthogonally oriented mirrors on a monocrystalline silicon substrate 110. In particular, since monocrystalline silicon does not include orthogonal crystalline planes, it may be difficult to fabricate orthogonal mirrors using conventional wet etching methods. Reactive Ion Etching (RIE) can be used to make the configuration shown in FIG. 1. Unfortunately, reactive ion etching may produce surface imperfections that can degrade the quality of the mirrors, so that the add-drop optical switch 100 may have degraded performance compared to that obtained by wet etching along the crystalline planes.

SUMMARY OF THE INVENTION

The present invention can provide add-drop optical switches that include fixed reflectors, such as fixed mirrors, and movable reflectors, such as movable mirrors, wherein none of the fixed reflectors and none of the movable reflectors are oriented orthogonal to one another on a substrate when the movable reflectors are in a radiation reflecting position. In preferred embodiments, each of the fixed and movable reflectors is oriented parallel to or at a 70° angle to, the remaining fixed and movable reflectors when the movable reflectors are in the radiation reflecting position. Most preferably, the fixed reflectors and the movable reflectors all are oriented on the substrate in parallel when the movable reflectors are in the radiation reflecting position. By providing these orientations of fixed and movable reflectors, add-drop optical switches may be fabricated on silicon substrates using wet etching along crystallographic planes. High performance add-drop optical switches thereby may be provided.

First embodiments of add-drop optical switches according to the present invention include a substrate, an ADD optical path on the substrate that receives radiation, an IN optical path on the substrate that receives optical radiation, an OUT optical path on the substrate that transmits optical radiation and a DROP optical path on the substrate that transmits optical radiation. As was described above, the optical radiation can include visible, ultraviolet, infrared and/or other forms of electromagnetic radiation. A plurality of fixed reflectors are fixedly coupled to the substrate. A plurality of movable reflectors are movably coupled to the substrate for movement to and away from a radiation reflecting position. The fixed reflectors and the movable reflectors are arranged on the substrate to selectively couple the IN optical path to the OUT optical path, to selectively couple the IN optical path to the DROP optical path, and to selectively couple the ADD optical to the OUT optical path. None of the fixed reflectors that are used to provide the above-described functionality are oriented orthogonal to one another on the substrate. Moreover, none of the movable reflectors that are used to provide the above-described functionality are oriented orthogonal to one another on the substrate when the movable reflectors are in the radiation reflecting position.

In preferred embodiments of the present invention, the substrate comprises monocrystalline silicon, and each of the fixed and movable reflectors is oriented parallel to or at a 70° angle to the remaining fixed and movable reflectors when the movable reflectors are in the radiation reflecting position. In other preferred embodiments, all of the fixed and movable reflectors are oriented in parallel when the movable reflectors are in the radiation reflecting position. In preferred embodiments, the ADD, IN, OUT and DROP optical paths all are oriented on the substrate in parallel. In other preferred embodiments, the ADD, IN, OUT and DROP optical paths all are oriented on the substrate at a 45° angle or at a 65° angle relative to the fixed reflectors and the movable reflectors in the radiation reflecting position.

Other embodiments of the present invention orient the fixed reflectors and the movable reflectors on the substrate in parallel when the movable reflectors are in the radiation reflecting position and when the movable reflectors are away from the radiation reflecting position. In these embodiments, the movable reflectors may be slideably mounted on the substrate to move linearly to and away from the radiation reflecting position. In other embodiments, the movable reflectors may be oriented in parallel only when they are in the radiation reflecting position. They may be rotated flat against the substrate or rotated about an axis that is orthogonal to the substrate away from the radiation reflecting position.

In preferred embodiments of the present invention, the plurality of fixed reflectors comprise a first and a second fixed reflector, and the plurality of movable reflectors comprise a first and a second movable reflector. In other preferred embodiments, the IN optical path and the OUT optical path are collinear and the first and second movable reflectors are arranged between the IN optical path and the OUT optical path when the first and second movable reflectors are in the radiation reflecting position. The first and second movable reflectors preferably are arranged between the ADD optical path and the OUT optical path at a 45° angle thereto. The first fixed reflector preferably is arranged on the substrate to reflect optical radiation from the first movable reflector to the DROP optical path and the second fixed reflector is arranged on the substrate to reflect optical radiation from the ADD optical path to the second movable reflector.

Other embodiments of the present invention can add a second ADD optical path, a second IN optical path, a second OUT optical path and a second DROP optical path on the substrate. A third fixed reflector and a third and a fourth movable reflector may be added. In preferred embodiments, the second IN optical path and the second OUT optical path are collinear, and the third and fourth movable reflectors are arranged between the IN optical path and the second OUT optical path when the third and fourth movable reflectors are in the radiation reflecting position. The first fixed reflector is between the DROP optical path and the first movable reflector and between the second ADD optical path and the fourth movable reflector. The second fixed reflector is between the ADD optical path and the second movable reflector. The third fixed reflector is between the second DROP optical path and the third movable reflector. Thus, these embodiments can allow the first fixed reflector to be shared by the first and second add-drop optical switches.

More generally, add-drop optical switches according to embodiments of the present invention can include a substrate, a plurality of ADD optical paths, a corresponding plurality of IN optical paths, a corresponding plurality of OUT optical paths, and a corresponding plurality of DROP optical paths on the substrate. An array of fixed reflectors is fixedly coupled to the substrate and an array of movable reflectors is movably coupled to the substrate for movement to and away from a radiation reflecting position. The fixed reflectors and the movable reflectors are arranged on the substrate to selectively couple a corresponding one of the IN optical paths to a corresponding one of the OUT optical paths, to selectively couple a corresponding one of the IN optical paths to a corresponding one of the DROP optical paths, and to selectively couple a corresponding one of the ADD optical paths to a corresponding one of the OUT optical paths. The fixed reflectors all are oriented on the substrate in parallel and the movable reflectors all are oriented on the substrate in parallel when the movable reflectors are in the radiation reflecting position. The plurality of ADD, IN, OUT and DROP optical paths also are oriented on the substrate in parallel, and at a 45° angle relative to the fixed reflectors and the movable reflectors in the radiation reflecting position.

In preferred embodiments of multiple add-drop optical switches on a single substrate, the plurality of fixed reflectors comprise the corresponding plurality minus one of shared fixed reflectors and the plurality of movable reflectors comprise the corresponding plurality of first movable reflectors and the corresponding plurality of second movable reflectors. The corresponding first and second movable reflectors are arranged between the corresponding IN and OUT optical paths when the first and second movable reflectors are in the radiation reflecting position. The corresponding first and second movable reflectors are arranged between the corresponding IN and OUT optical paths, at a 45° angle thereto, when the corresponding first and second movable reflectors are in the radiation reflecting position. The shared reflector(s) preferably are between a respective first and second reflector of a respective adjacent pair of collinear IN and OUT optical paths.

Add-drop optical switches may be fabricated, according to embodiments of the present invention, by etching a monocrystalline substrate only along crystallographic planes thereof, to form an array of fixed and movable reflectors. Parallel ADD, DROP, IN and OUT optical paths also may be fabricated on the monocrystalline substrate or on another substrate. The ADD, DROP, IN and OUT optical paths may be fabricated after or prior to etching the monocrystalline substrate. The etching step preferably comprises wet etching the monocrystalline substrate only along crystallographic planes thereof, to form the array of fixed and movable reflectors. For example, when the monocrystalline substrate is silicon, it may be etched only at 0° and 70° crystallographic planes.

Accordingly, add-drop optical switches may be provided that can be fabricated by wet etching along crystallographic planes of a silicon substrate. High performance add-drop optical switches thereby may be provided. Moreover, the parallel oriented reflectors can provide compact structures and array of add-drop optical switches that are amenable to low cost mass production.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present. Also, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present invention can provide optical add-drop switch configurations that can include high quality reflector surfaces that can be fabricated by wet etching. Full functionality (four states) may be provided using only two movable reflectors. The input and output paths may be provided only on two sides of the substrate and parallel input/output paths may be provided for mating to optical fibers. Moreover, as will be described below, the arrangement can allow arrays of optical add-drop switches to be provided. Crystal plane smoothness may be provided for all reflective surfaces.

Figure 2:
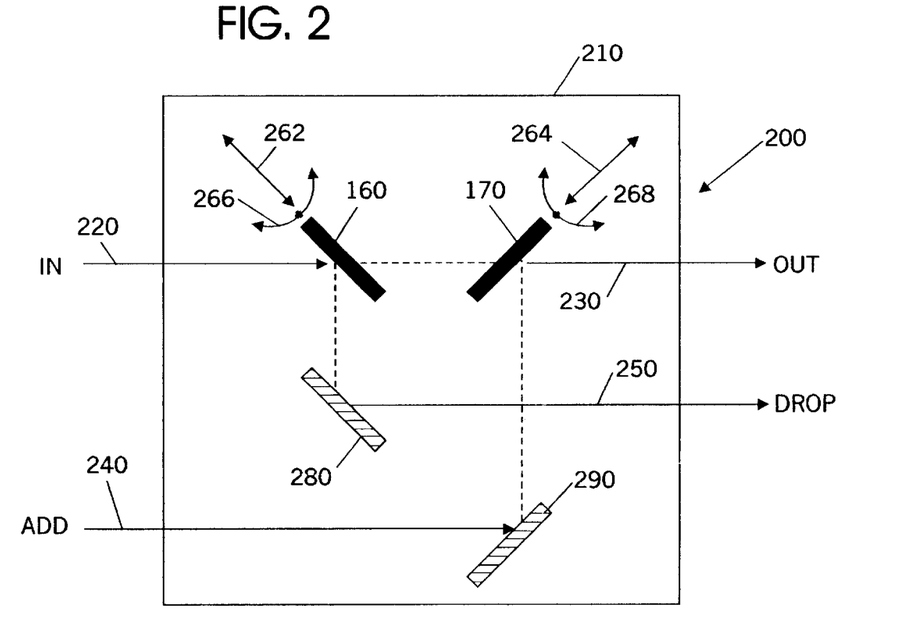
FIGS. 2–5 are top views of add-drop optical switches according to embodiments of the present invention.

Referring now to FIG. 2, first embodiments of add-drop optical switches according to the present invention will be described. As shown in FIG. 2, these embodiments of add-drop optical switches preferably are fabricated on a substrate 210, most preferably a 100 monocrystalline silicon substrate that is commonly used in the microelectronics industry. An ADD optical path 240 is provided on the substrate that receives optical radiation. An IN optical path 220 is provided on the substrate that receives optical radiation. An OUT optical path 230 is provided on the substrate that transmits optical radiation. A DROP optical path 250 is provided on the substrate that transmits optical radiation. It will be understood that, as used herein, the term "optical radiation" includes visible, ultraviolet, infrared and/or other types of electromagnetic radiation. Moreover, the optical paths may be provided by a free space optical path, an optical fiber optical path and/or other conventional optical paths. For example, conventional "V groove" optical paths may be provided that accept an end of an optical fiber and align the end relative to the add-drop optical switch 200.

A plurality of movable reflectors are movably coupled to the substrate for movement to and away from a radiation reflecting position. A plurality of fixed reflectors are fixedly coupled to the substrate. For example, as shown in FIG. 2, a first fixed reflector 280 and a second fixed reflector 290 are fixedly mounted on the substrate 210, preferably at an angle of 45° relative to the optical paths 220, 240, 230 and 250 adjacent thereto. It will be understood that the fixed reflectors preferably are mirrors. However, diffraction gratings and/or other conventional reflectors also may be used.

Still referring to FIG. 2, a plurality of movable reflectors also are provided that are movably coupled to the substrate for movement to and away from a radiation reflecting position. More specifically, two movable reflectors such as movable mirrors 260 and 270 are movably coupled to the substrate 210 for movement to and away from a radiation reflecting position. In FIG. 2 and all subsequent figures, the movable reflectors are indicated by solid black shading, whereas the fixed reflectors are indicated by cross hatching. Moreover, in FIG. 2 and all subsequent figures, the movable reflectors 260 and 270 are illustrated in the radiation reflecting position.

The movable reflectors 260 and 270 may be moved away from the radiation reflecting position shown in FIG. 2, for example by movement in the direction of arrows 262 and 264 respectively. It will be understood, however, that the movable reflectors 260 and 270 also may be moved away from the radiation reflecting position by rotation about an axis perpendicular to the face of the substrate 210 as shown by arrows 266 and 268. In yet other embodiments, the movable reflectors 260 and 270 may be moved from perpendicular to the substrate face 210 to flat against the substrate face 210. In still other embodiments, the movable reflectors 260 and 270 may be moved away from the substrate and/or into a trench in the substrate, while still remaining orthogonal thereto. Combinations of these movements and/or other movements also may be provided, as is well known to those having skill in the art, to allow the movable reflectors to move to and away from the radiation reflecting positions. The movable reflectors 260 and 270 may be moved using conventional actuators. Preferred embodiments use thermal arched beam microelectromechanical actuators as are described in U.S. Pat. Nos. 5,909,078, 5,962,949, 5,994,816, 5,995,817 and 6,023,121, the disclosures of all of which are hereby incorporated herein by reference.

Still referring to FIG. 2, the fixed reflectors and the movable reflectors are arranged on the substrate 210 to selectively couple the IN optical path 220 to the OUT optical path 230, to selectively couple the IN optical path 220 to the DROP optical path 250 and to selectively couple the ADD optical path 240 to the OUT optical path 230. Accordingly, add-drop optical switches of FIG. 2 can provide the four valid states of a conventional add-drop switch:

(1) IN to OUT, DROP disconnected, ADD disconnected;
(2) IN to DROP, OUT disconnected, ADD disconnected;
(3) ADD to OUT, IN disconnected, DROP disconnected; and
(4) IN to DROP, ADD to OUT.

Moreover, FIG. 2 indicates that the optical paths 220, 230, 240 and 250 may extend in parallel adjacent the reflectors and may be arranged on the substrate 210 in parallel along the two opposite sides thereof. This can make the optical paths compatible with conventional V-groove fiber alignment structures.

Comparing FIG. 2 to FIG. 1, it can be seen that both in FIG. 2 and in FIG. 1, reflectors are oriented orthogonal to one another. Accordingly, it still may be difficult to fabricate the configuration of FIG. 2 in silicon substrates 210 using wet etching techniques. Reactive ion etching can be used to make the configuration of FIG. 2, but the mirror quality and precision in such an implementation may be degraded compared to that obtained by wet etching along crystalline planes.

However, the add-drop optical switch of FIG. 2 provides a realization that the fixed reflectors and movable reflectors can be arranged on the substrate such that none of the fixed reflectors and the movable reflectors need be oriented orthogonal to one another on the substrate when the movable reflectors are in the radiation reflecting position. In particular, the present invention stems from a realization that a conventional add-drop optical switch of FIG. 1 uses what will be referred to herein as "additive" reflection angles. For example, the optical radiation entering the IN optical path 120 is deflected by 90° due to the first movable mirror 160 and then deflected by an additional 90° by the first fixed mirror 180, for a total of 180°, before exiting the DROP optical path. In sharp contrast, switch configurations of FIG. 2 can employ "subtractive" reflection angles. Thus, for example, optical radiation entering the IN optical path 220 is deflected by +90° by the first movable reflector 260 and then deflected by −90° back to its original direction by the first fixed reflector 280 before exiting the DROP optical path 250. The "additive" optical path of FIG. 1 can only add 90°+90° to provide 180°. Yet, in the "subtractive" path of FIG. 2, any arbitrary angle can be used, because X°−X°=0° for any X.

Figure 3A:
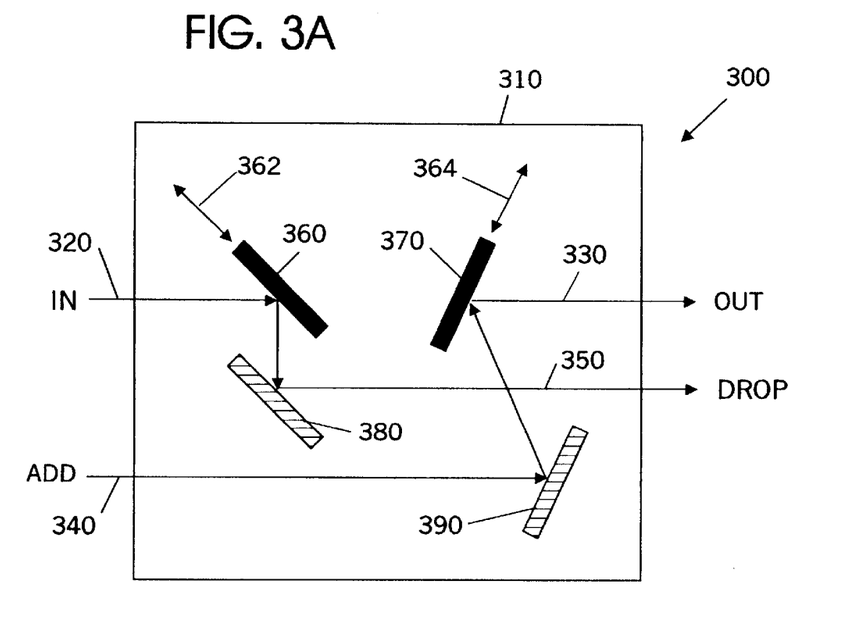
Figure 3B:
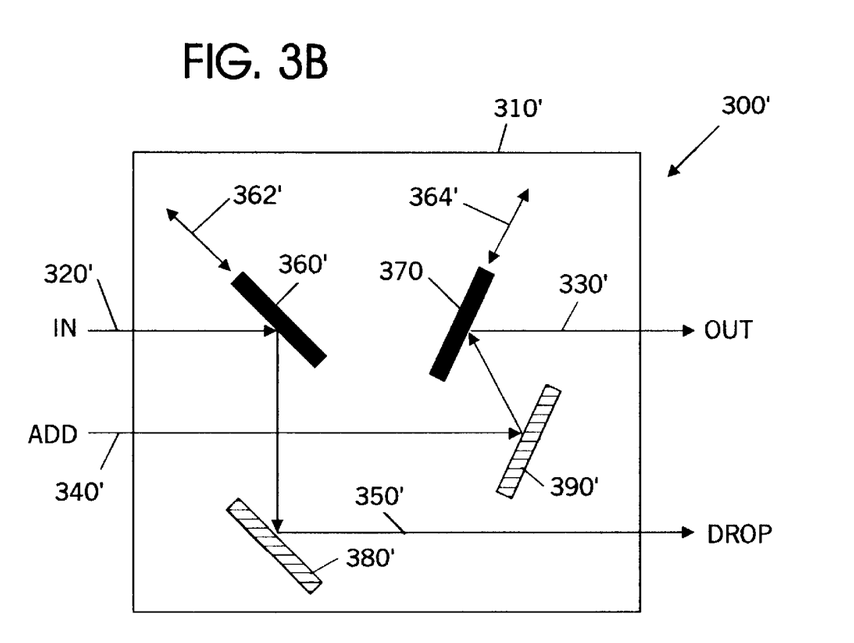

FIGS. 3A and 3B are top views of embodiments of add-drop optical switches according to the invention that can take advantage of "subtractive" configurations. As shown in FIG. 3A, an IN optical path 320 is coupled to a DROP optical path 350 by a first movable reflector 360 oriented at a 45° angle relative to the IN optical path 320 and a first fixed reflector 380 oriented at a 45° angle relative to the DROP optical path 350. The ADD optical path 340 is coupled to the OUT optical path 330 by a second fixed reflector 390 that is oriented at a 65° angle relative to the ADD optical path 340 and a second movable reflector 370 that is oriented at a 65° angle relative to the OUT optical path 330. Thus, the second fixed reflector 390 and the second movable reflector 370 are oriented at a 70° angle relative to the first movable reflector 360 and the first fixed reflector 380. The movable reflectors 360 and 370 may move in the directions 362 and 364, and/or other directions as was described above.

The 70° angle between reflective surfaces can be achieved by wet etching a monocrystalline silicon substrate. It will be understood that the 70° angle is approximate, because the actual angle of the crystallographic plane is 70.6°. Accordingly, in FIG. 3A, none of the fixed reflectors are oriented orthogonal to one another on the substrate. Moreover, none of the movable reflectors are oriented orthogonal to one another on the substrate when the movable reflectors are in the radiation reflecting position. More specifically, each of the fixed and movable reflectors is oriented parallel to or at a 70° angle to the remaining fixed and movable reflectors when the movable reflectors are in the radiation reflecting position. FIG. 3A and the remaining figures which follow incorporate the above described alternate embodiments of optical paths, reflectors and actuation directions.

FIG. 3B illustrates a similar configuration to FIG. 3A, wherein like elements are indicated by prime (') notation. A difference between FIG. 3A and FIG. 3B is that FIG. 3A includes a relatively short IN-DROP optical path 320/350 and a relatively long ADD-OUT optical path 340/330, whereas FIG. 3B has a relatively long IN-DROP optical path 320'/350' and a relatively short ADD-OUT optical path 340'/330'. Other embodiments may provide equal length IN-DROP and ADD-OUT optical paths.

Still referring to FIGS. 3A and 3B, it can be seen that the first and second movable reflectors 360/360' and 370/370', and the first fixed reflector 380/380' may be oriented on the corners of a rectangle. The placement of the second fixed reflector 390/390' may be determined empirically and/or trigonometrically. For example, in FIGS. 3A and 3B, the horizontal separation of the second fixed reflectors 390 and 390' can be equal to their vertical separation divided by tan(50°).

Figure 4A:
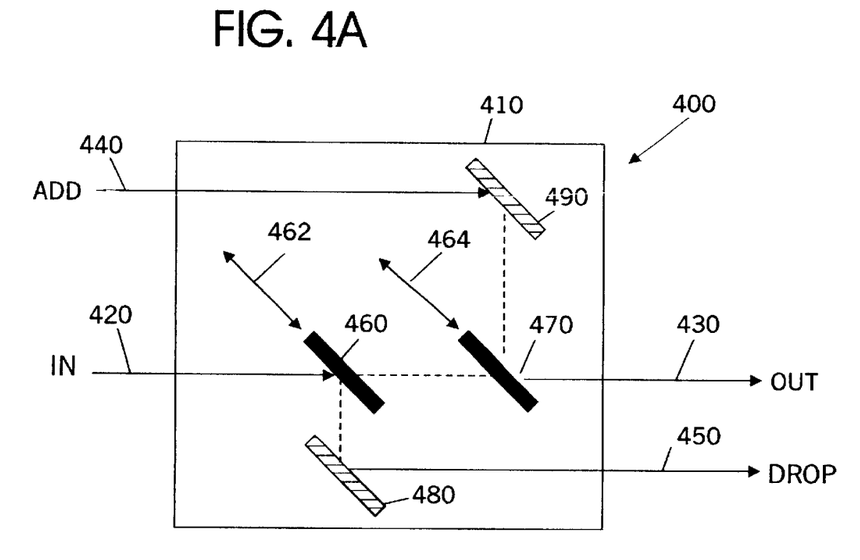
Figure 4B:
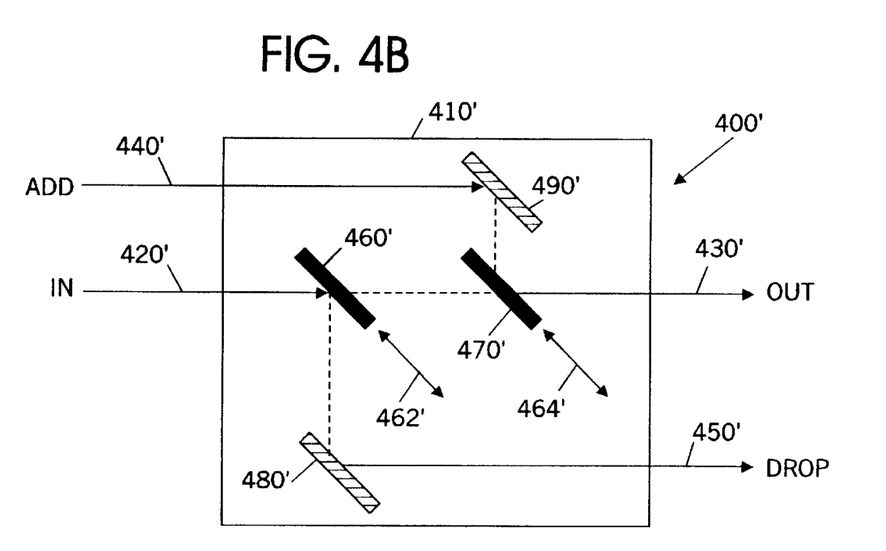

FIGS. 4A and 4B illustrate other embodiments of add-drop optical switches according to the present invention. As shown in FIGS. 4A and 4B, in these embodiments, the fixed reflectors all are oriented on the substrate in parallel and the movable reflectors all are oriented on the substrate in parallel when the movable reflectors are in the radiation reflecting position. Thus, these add-drop optical switch configurations need only fabricate mirrors along a single crystal plane. Moreover, the layout may be straightforward compared to FIGS. 3A and 3B because trigonometry and/or empirical determinations may not be needed to place the reflectors on the substrates.

Referring to FIG. 4A, these embodiments of add-drop optical switches 400 include a substrate 410, an ADD optical path 440, an IN optical path 420, and OUT optical path 430 and a DROP optical path 450 on a substrate 410. A plurality of fixed reflectors are fixedly mounted on the substrate 410. More particularly, a first fixed reflector 480 and a second fixed reflector 490 are fixedly coupled to the substrate 410. A plurality of movable reflectors are movably coupled to the substrate for movement to and away from a radiation reflecting position.

In particular, a first movable reflector 460 and a second movable reflector 470 are movably coupled to the substrate for movement to and away from a radiation reflecting position, for example in a direction shown by arrows 462 and 464. The fixed reflectors 480 and 490, and the movable reflectors 460 and 470 all are oriented on the substrate 410 in parallel when the movable reflectors 460 and 470 are in the radiation reflecting position shown in FIG. 4A. When the movable reflectors 460 and 470 are moved to and away from the radiation reflecting position by translation without rotation, the movable reflectors 460 and 470 also may be oriented on the substrate in parallel when the movable reflectors are away from the radiation reflecting position. However, when rotation is involved, the movable reflectors may not be oriented in parallel when the movable reflectors are away from the radiation reflecting position shown in FIG. 4A.

As also shown in FIG. 4A, the ADD, IN, OUT and DROP optical paths 440, 420, 430 and 450, respectively, all are oriented on the substrate in parallel adjacent the respective reflector. More preferably, the ADD, IN, OUT and DROP optical paths 440, 420, 430 and 450, respectively, all are oriented on the substrate 410 at a 45° angle relative to the fixed reflectors 480 and 490 and the movable reflectors 460 and 470 in the radiation reflecting position.

As also shown in FIG. 4A, the IN optical path 420 and the OUT optical path 430 preferably are collinear, and the first and second movable reflectors 460 and 470 are arranged between the IN optical path 420 and the OUT optical path 430 when the first and second movable reflectors 460 and 470 are in the radiation reflecting position shown in FIG. 4A. The first and second movable reflectors 460 and 470 preferably are arranged between the IN optical path 420 and the OUT optical path 430 at a 45° angle thereto when the first and second movable reflectors are in the radiation reflecting position. The first fixed reflector 480 is between the DROP optical path 450 and the first movable reflector 460 and the second fixed reflector 490 is between the ADD optical path 440 and the second movable reflector 470. Stated differently, the first fixed reflector 480 is arranged on the substrate 410 to reflect optical radiation from the first movable reflector 460 to the DROP optical path 450 and the second fixed reflector 490 is arranged on a substrate to reflect optical radiation from the ADD optical path 440 to the second movable reflector 470. The IN and ADD optical paths 420 and 440 extend to a first side of the substrate 410, shown at the left in FIG. 4A, and the OUT and DROP optical paths 430 and 450 respectively extend to a second side of the substrate that is opposite the first side, shown at the right in FIG. 4A.

FIG. 4B shows a similar configuration to FIG. 4A, wherein like elements are indicated by prime (') notation. A difference between FIG. 4A and FIG. 4B is that the ADD-OUT path 440/430 of FIG. 4A is relatively long compared to the IN-DROP path 420/450 of FIG. 4A, whereas the ADD-OUT path 440'/430' of FIG. 4B is relatively short compared to the IN-DROP path 420'/450' of FIG. 4B. It also will be understood that the fixed and movable reflectors may be arranged to provide equal path lengths.

Figure 5:
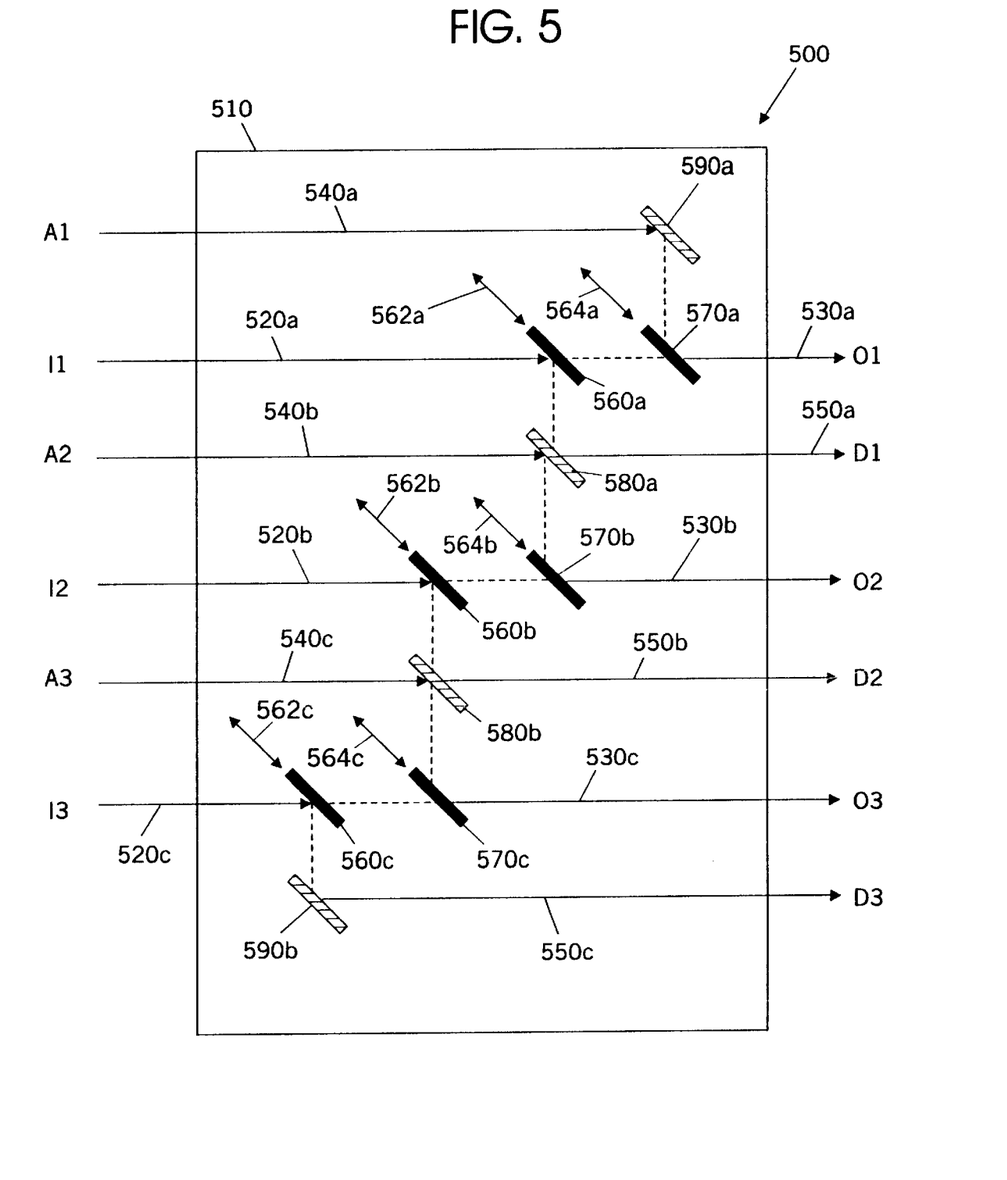

FIG. 5 illustrates other embodiments of add-drop optical switches according to the present invention, wherein a plurality of ADD, IN, OUT and DROP optical paths are provided, wherein an array of fixed reflectors and movable reflectors are provided, wherein the fixed reflectors all are oriented on a substrate in parallel and wherein the movable reflectors all are oriented on the substrate in parallel when the movable reflectors are in the radiation reflecting position. Moreover, one or more shared fixed reflectors may be provided to increase the integration density of the add-drop optical switch. FIG. 5 illustrates the integration of three add-drop optical switches onto a single substrate. However, it will be understood that two or more add-drop optical switches may be integrated.

More specifically, these embodiments of add-drop optical switches 500 include a substrate 510, a plurality, here three, of ADD optical paths 540a–540c, a corresponding plurality, here three, of IN optical paths 520a–520c, a corresponding plurality, here three, of OUT optical paths 530a–530c, and a corresponding plurality, here three, of DROP optical paths 550a–550c on the substrate. An array of fixed reflectors 590a, 590b, 580a and 580b are fixedly coupled to the substrate 510. An array of movable reflectors 560a–560c and 570a–570c are movably coupled to the substrate 510 for movement to and away from a radiating deflecting position, for example along a direction indicated by arrows 562a–562c and 564a–564c. The fixed reflectors and the movable reflectors are arranged on the substrate to selectively couple a corresponding one of the IN optical paths to a corresponding one of the OUT optical paths, to selectively couple a corresponding one of the IN optical paths to a corresponding one of the DROP optical paths and to selectively couple a corresponding one of the ADD optical paths to a corresponding one of the OUT optical paths.

As shown in FIG. 5, the fixed reflectors 590a, 590b and 580a, 580b all are oriented on the substrate in parallel and the movable reflectors 570a–570c and 560a–560c all are oriented on the substrate in parallel when the movable reflectors are in the radiation reflecting position shown in FIG. 5. Moreover, the plurality of ADD, IN, OUT and DROP optical paths all are oriented on the substrate in parallel adjacent the reflectors, and preferably at a 45° angle relative to the fixed reflectors and the movable reflectors in the radiation reflecting position.

Still referring to FIG. 5, at least one of the fixed reflectors may be shared between adjacent add-drop optical switches. In particular, the corresponding plurality (three in FIG. 5) of first movable reflectors 560a–560c and second movable reflectors 570a–570c may be provided, whereas the corresponding plurality minus one (two in FIG. 5) of shared fixed reflectors 580a and 580b may be provided. Additionally, two unshared fixed reflectors 590a and 590b may be provided.

As shown in FIG. 5, the shared fixed reflectors 580a and 580b preferably are reflective on both faces thereof. A shared reflector 580a, 580b is provided between a respective first and second reflector 560a, 570b and 560b, 570c of a respective adjacent pair of collinear IN and OUT optical paths. Accordingly, highly integrateable add-drop optical switch arrays may be provided on a substrate.

In the embodiments of FIG. 5, and in any of the previously described embodiments, individual actuators may be provided for each of the movable reflectors as was described above. Global actuators also may be provided in a manner described in copending application Ser. No. 09/542,170 entitled *Microelectromechanical Optical Cross-Connect Switches Including Mechanical Actuators and Methods of Operating Same* (now U.S. Pat. No. 6,445,842) assigned to the assignee of the present application, the disclosure of which is hereby incorporated herein by reference. Other actuation techniques may be used.

The add-drop optical switch embodiments of FIGS. 4A, 4B and 5 may be preferred due to the relative ease of fabrication and the compact structures thereof. However, the configurations of FIGS. 3A and 3B may be preferred due to other considerations, such as placement of the actuators and/or packaging considerations.

Figure 6:
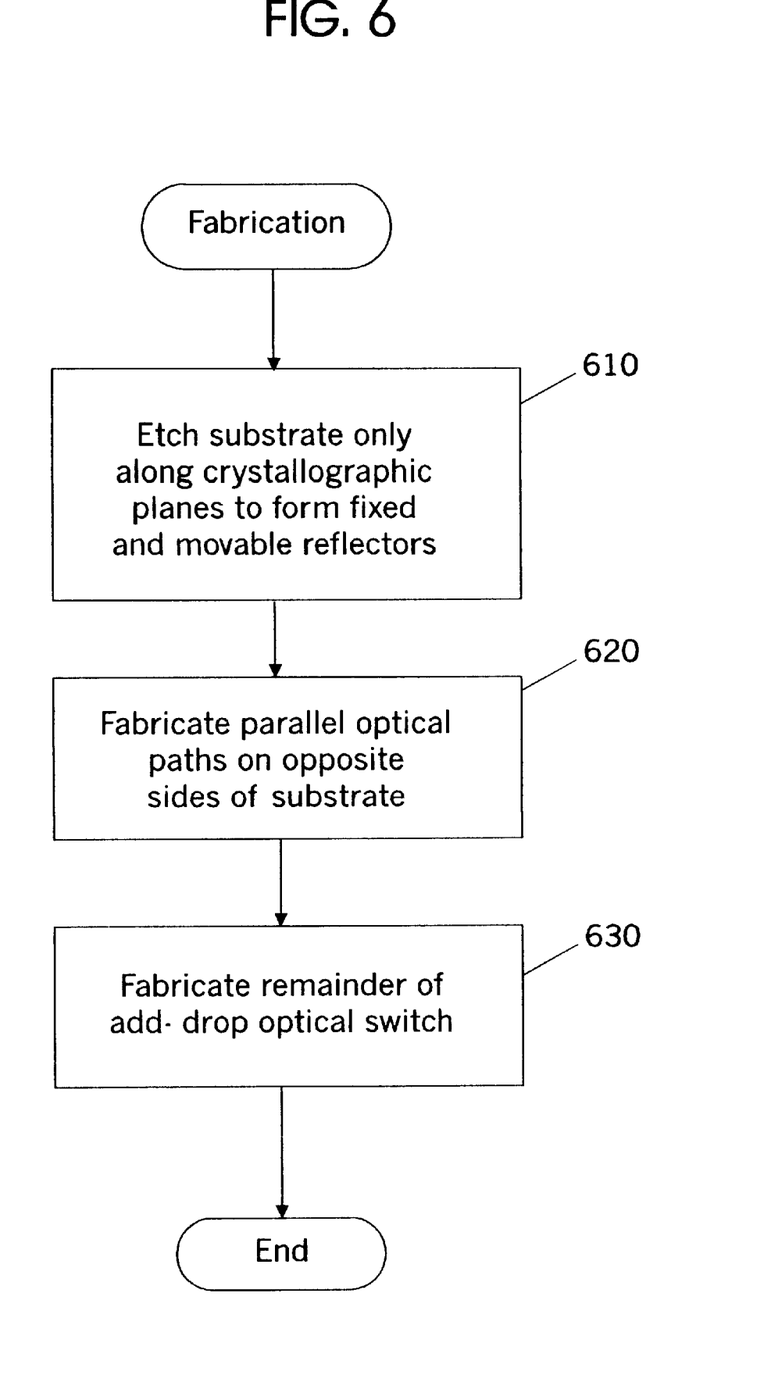
FIG. 6 is a flowchart illustrating operations for fabricating add-drop optical switches according to embodiments of the present invention.

Referring now to FIG. 6, methods of fabricating add-drop optical switches according to the present invention are illustrated. More specifically, referring to FIG. 6, at Block 610 a substrate is etched only along crystallographic planes thereof, to form the fixed and movable reflectors. For example, for a silicon substrate, etching may be performed only along the 45° and 70° angles. At Block 620, parallel optical paths are fabricated on opposite sides of the substrate. At Block 630, the remainder of the add-drop optical switch is fabricated.

It will be understood that the order of the Blocks 610, 620 and 630 may be changed so that, for example, the optical paths may be fabricated prior to etching the substrate. Moreover, two or more of the blocks may be performed simultaneously or in an overlapping manner. Moreover, the operations of each of the blocks may be divided into one or more sub-operations which may precede or follow other sub-operations. However, the present invention preferably allows the substrate to be etched only along crystallographic planes, while allowing parallel optical paths on opposite sides of the substrate to be used.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An add-drop optical switch comprising:
    a substrate;
    an ADD optical path on the substrate that receives optical radiation;
    an IN optical path on the substrate that receives optical radiation;
    an OUT optical path on the substrate that transmits optical radiation;
    a DROP optical path on the substrate that transmits optical radiation;
    a plurality of fixed reflectors that are fixedly coupled to the substrate, none of which are oriented orthogonal to one another on the substrate; and
    a plurality of movable reflectors that are movably coupled to the substrate for movement to and away from a radiation reflecting position, none of which are oriented orthogonal to one another on the substrate when in the radiation reflecting position;

wherein the fixed reflectors and the movable reflectors are arranged on the substrate to selectively couple the IN optical path to the OUT optical path, to selectively couple the IN optical path to the DROP optical path and to selectively couple the ADD optical path to the OUT optical path;

wherein the plurality of fixed reflectors comprise a first and a second fixed reflector and wherein the plurality of movable reflectors comprise a first and a second movable reflector;

wherein the IN optical path and the OUT optical path are collinear and wherein the first and second movable reflectors are arranged between the IN optical path and the OUT optical path when the first and second movable reflectors are in the radiation reflecting position; and wherein the first and second movable reflectors are arranged between the IN optical path and the OUT optical path, at a 45° angle thereto and at a 65° angle thereto, respectively, when the first and second movable reflectors are in the radiation reflecting position.

2. An add-drop optical switch according to claim 1 wherein the first fixed reflector is between the DROP optical path and the first movable reflector and wherein the second fixed reflector is between the ADD optical path and the second movable reflector.

3. An add-drop optical switch according to claim 1 wherein the IN and ADD optical paths extend to a first side of the substrate and wherein the OUT and DROP optical paths extend to a second side of the substrate that is opposite the first side.

4. An add-drop optical switch comprising:

a substrate;

an ADD optical path on the substrate that receives optical radiation;

an IN optical path on the substrate that receives optical radiation;

an OUT optical path on the substrate that transmits optical radiation;

a DROP optical path on the substrate that transmits optical radiation;

a plurality of fixed reflectors that are fixedly coupled to the substrate, none of which are oriented orthogonal to one another on the substrate; and a plurality of movable reflectors that are movably coupled to the substrate for movement to and away from a radiation reflecting position, none of which are oriented orthogonal to one another on the substrate when in the radiation reflecting position;

wherein the fixed reflectors and the movable reflectors are arranged on the substrate to selectively couple the IN optical path to the OUT optical path, to selectively couple the IN optical path to the DROP optical path and to selectively couple the ADD optical path to the OUT optical path;

wherein the IN optical path and the OUT optical path are collinear and wherein the first and second movable reflectors are arranged between the IN optical path and the OUT optical path when the first and second movable reflectors are in the radiation reflecting position;

wherein the first fixed reflector is between the DROP optical path and the first movable reflector and wherein the second fixed reflector is between the ADD optical path and the second movable reflector; and wherein the first fixed reflector is between the DROP optical path and the first movable reflector at a 45° angle to the DROP optical path and wherein the second fixed reflector is between the ADD optical path and the second movable reflector at a 65° angle to the ADD optical path.

5. An optical switch comprising:

a substrate comprising monocrystalline silicon;

a plurality of parallel input optical paths on the substrate that receive optical radiation;

a plurality of parallel output optical paths on the substrate that transmit optical radiation and that are parallel to the plurality of parallel input optical paths;

a plurality of fixed reflectors that are fixedly coupled to the substrate; and a plurality of movable reflectors that are movably coupled to the substrate for movement to and away from a radiation reflecting position;

wherein the plurality of fixed reflectors and the plurality of movable reflectors are arranged on the substrate to selectively couple the plurality of input optical paths to the plurality of output optical paths and wherein each of the fixed and movable reflectors is oriented along a crystallographic plane of the monocrystalline silicon when the movable reflectors are in the radiation reflecting position; and wherein at least one of the input optical paths is oriented on the substrate at a 65° angle relative to at least one of the fixed reflectors or the movable reflectors in the radiation reflecting position.

6. An optical switch according to claim 5 wherein all of the fixed and movable reflectors are oriented in parallel when the movable reflectors are in the radiation reflecting position.

7. An optical switch according to claim 5 wherein none of the fixed and movable reflectors are oriented orthogonal to one another on the substrate.

8. An optical switch comprising:

a substrate comprising monocrystalline silicon;

a plurality of parallel input optical paths on the substrate that receive optical radiation;

a plurality of parallel output optical paths on the substrate that transmit optical radiation and that are parallel to the plurality of parallel input optical paths;

a plurality of fixed reflectors that are fixedly coupled to the substrate; and a plurality of movable reflectors that are movably coupled to the substrate for movement to and away from a radiation reflecting position;

wherein the plurality of fixed reflectors and the plurality of movable reflectors are arranged on the substrate to selectively couple the plurality of input optical paths to the plurality of output optical paths and wherein each of the fixed and movable reflectors is oriented along a crystallographic plane of the monocrystalline silicon when the movable reflectors are in the radiation reflecting position; and wherein at least one of the output optical paths is oriented on the substrate at a 65° angle relative to at least one of the fixed reflectors or the movable reflectors in the radiation reflecting position.

* * * * *